(12) United States Patent
Hara

(10) Patent No.: US 7,224,980 B2
(45) Date of Patent: May 29, 2007

(54) RADIO SYSTEM

(75) Inventor: Kentaro Hara, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 933 days.

(21) Appl. No.: 09/941,732

(22) Filed: Aug. 30, 2001

(65) Prior Publication Data

US 2002/0025823 A1 Feb. 28, 2002

(30) Foreign Application Priority Data

Aug. 30, 2000 (JP) .......................... P. 2000-260658

(51) Int. Cl.
*H04Q 7/20* (2006.01)

(52) U.S. Cl. ............... 455/456.1; 340/10.1; 340/425.5; 340/539; 340/825.31; 455/52.3; 455/69; 455/70; 455/78; 455/92; 455/99; 455/134; 455/152.1; 455/161.3; 455/226.2; 455/227; 455/456.2; 455/456.3; 455/456.4; 455/522

(58) Field of Classification Search ............... 340/10.1, 340/10.34, 10.4, 425.5, 426.1, 426.35, 426.36, 340/539, 825.69, 825.72, 825.31; 455/52.3, 455/69, 70, 78, 92, 99, 134, 152.1, 161.3, 455/226.2, 227, 456.1, 456.2, 456.3, 456.4, 455/522
See application file for complete search history.

(56) References Cited

U.S. PATENT DOCUMENTS

| | | | | |
|---|---|---|---|---|
| 4,733,215 A | * | 3/1988 | Memmola | .............. 340/426.17 |
| 5,517,189 A | | 5/1996 | Bachhuber et al. | |
| 6,006,096 A | * | 12/1999 | Trompower | .............. 455/456.2 |
| 6,087,987 A | * | 7/2000 | Bachhuber et al. | .......... 342/457 |
| 6,211,776 B1 | * | 4/2001 | Rohrl et al. | ........... 340/426.16 |
| 6,218,932 B1 | * | 4/2001 | Stippler | ................. 340/426.16 |
| 6,563,416 B1 | | 5/2003 | Zintler | |

FOREIGN PATENT DOCUMENTS

| | | |
|---|---|---|
| DE | 198 11 572 C1 | 2/2000 |
| DE | 199 00 415 A1 | 7/2000 |
| DE | 100 32 936 A1 | 2/2002 |
| EP | 0 980 800 A2 | 2/2000 |
| EP | 1 081 316 A1 | 3/2001 |
| JP | 09-317288 | 12/1997 |
| JP | 10-176447 | 6/1998 |
| JP | 08-275223 | 10/1998 |
| JP | 11-071948 | 3/1999 |
| JP | 11-101034 | 4/1999 |
| JP | 11-107592 | 4/1999 |
| JP | 2000-179206 A | 6/2000 |
| JP | 2001-130380 | 1/2001 |
| WO | WO 92/11431 | 7/1992 |

* cited by examiner

*Primary Examiner*—Duc M. Nguyen
*Assistant Examiner*—Matthew Genack
(74) *Attorney, Agent, or Firm*—Foley & Lardner LLP

(57) ABSTRACT

A stationary device 20 sends a portable-device finding signal to a portable device 10 from a plurality of stationary-device side antennae 24 and 25, which are located at different positions. Upon receipt of the portable-device finding signal from the stationary device 20, the portable device 10 sends a reception intensity data signal to the stationary device 20. The stationary device 20 determines the current position of the portable device 10 by using reception intensity data of the portable-device finding signals, which are received at the stationary-device side antennae, from the portable device 10.

8 Claims, 10 Drawing Sheets

FIG. 2

| PORTABLE DEVICE POSITION | AREA | RELATIONS OF THE TRANSMISSION INTENSITIES FROM THE TWO ANTENNAS | | |
|---|---|---|---|---|
| | | Pt (D1) > Pt (A1) | Pt (D2) = Pt (A2) | Pt (D3) < Pt (A3) |
| OUTSIDE THE VEHICLE ON THE DRIVER'S SEAT | Dout | E (D1) >> E (A1) | E (D2) >> E (A2) | E (D3) > E (A3) |
| NEAR THE DOOR | Dd | E (D1) > E (A1) | E (D2) > E (A2) | E (D3) > E (A3) |
| CENTER OF THE DRIVER'S SEAT | Dc | E (D1) > E (A1) | E (D2) > E (A2) | E (D3) = E (A3) |
| NEAR THE CENTER OF THE VEHICLE | Dcc | E (D1) > E (A1) | E (D2) > E (A2) | E (D3) < E (A3) |
| ON THE CENTER LINE OF THE VEHICLE | C | E (D1) > E (A1) | E (D2) = E (A2) | E (D3) < E (A3) |
| NEAR THE CENTER OF THE VEHICLE | Acc | E (D1) > E (A1) | E (D2) < E (A2) | E (D3) < E (A3) |
| CENTER OF THE ASSISTANT DRIVER'S SEAT | Ac | E (D1) = E (A1) | E (D2) < E (A2) | E (D3) < E (A3) |
| NEAR THE DOOR | Ad | E (D1) < E (A1) | E (D2) < E (A2) | E (D3) < E (A3) |
| OUTSIDE THE VEHICLE ON THE ASSISTANT DRIVER'S SEAT | Aout | E (D1) < E (A1) | E (D2) << E (A2) | E (D3) << E (A3) |

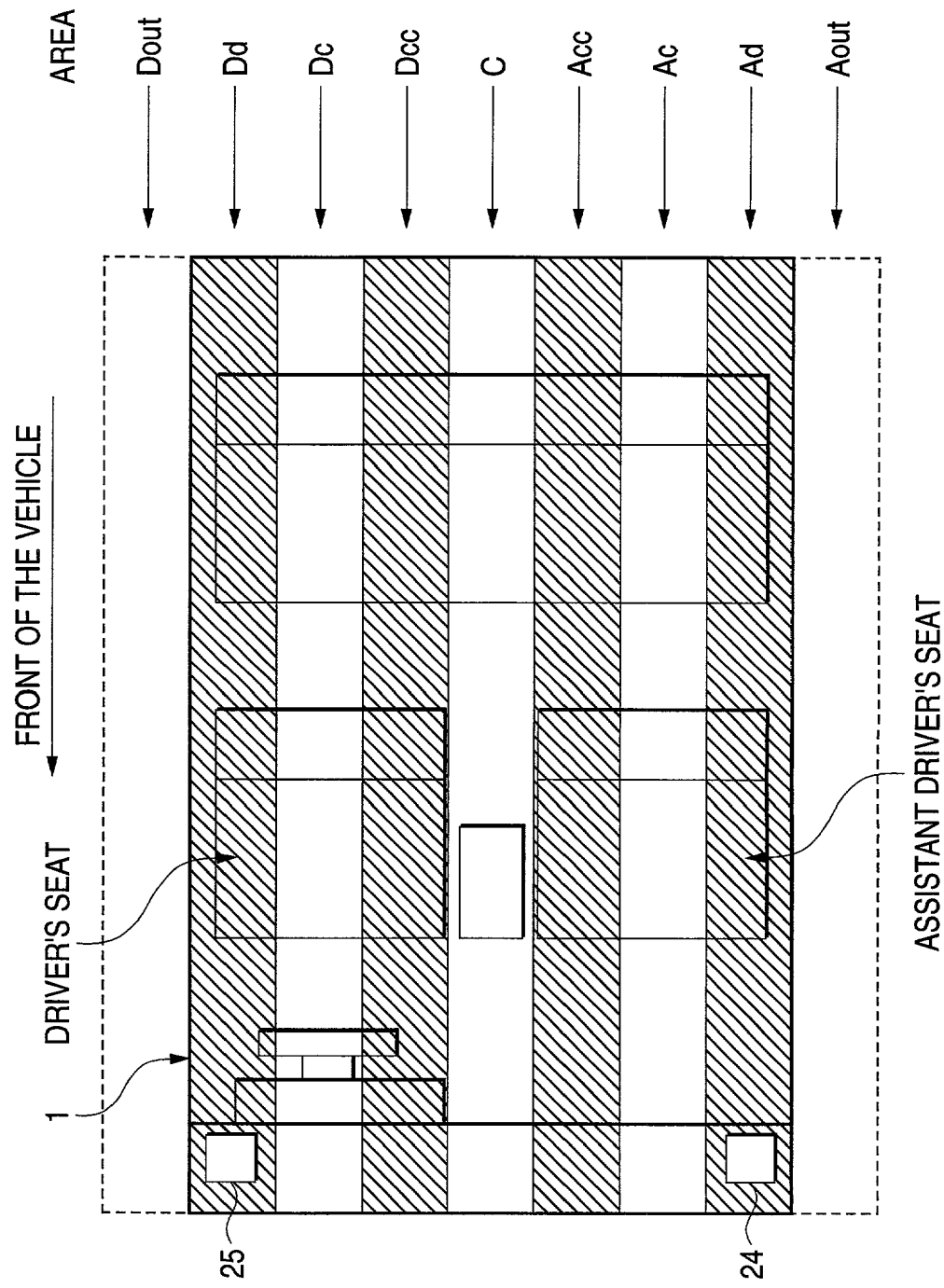

FIG. 4A

| MODE | |
|---|---|
| 1 | E (D) > > E (A) |
| 2 | E (D) > E (A) |
| 3 | E (D) = E (A) |
| 4 | E (D) < E (A) |
| 5 | E (D) < < E (A) |

FIG. 4B

| AREA | MODE CONBINATION |
|---|---|
| Dout | 112 |
| Dd | 222 |
| Dc | 223 |
| Dcc | 224 |
| C | 234 |
| Acc | 244 |
| Ac | 344 |
| Ad | 444 |
| Aout | 455 |

FIG. 8A

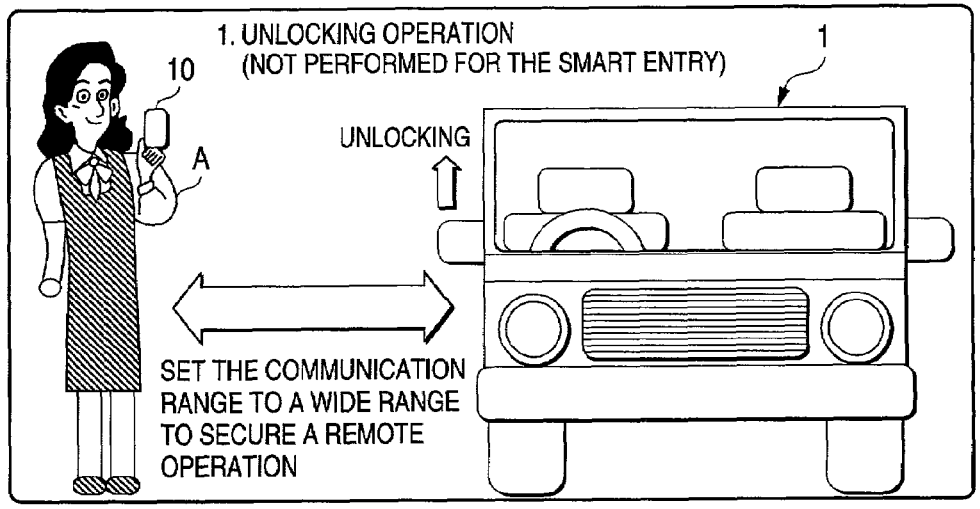

1. UNLOCKING OPERATION (NOT PERFORMED FOR THE SMART ENTRY)

SET THE COMMUNICATION RANGE TO A WIDE RANGE TO SECURE A REMOTE OPERATION

FIG. 8B

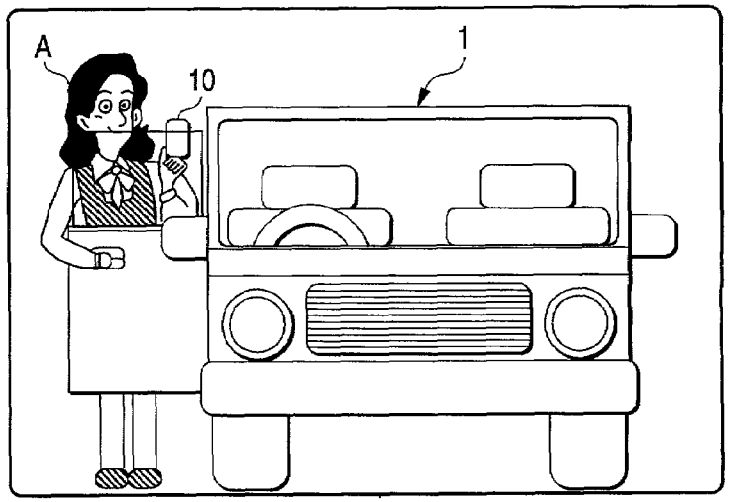

2. GET IN THE VEHICLE WHILE CARRYING THE PORTABLE DEVICE. AT THIS TIME, SPECIFY A POSITION OF THE PORTABLE DEVICE AND ITS MOTION.

FIG. 8C

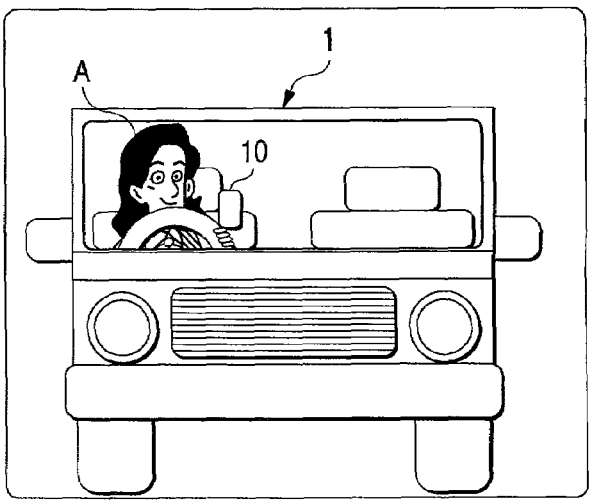

3. MAKE AN AUTHENTICATION FOR THE PERMISSION OF ENGINE START. SELECT THE NARROWEST COMMUNICATION RANGE (IN-CABIN COMMUNICATION RANGE) NECESSARY FOR THE AUTHENTICATION.

1. THE USER HOLDS THE PORTABLE DEVICE, AND THE DEVICE HAS AN AUTHENTICATION CODE.

2. GET OFF THE VEHICLE WHILE HOLDING THE PORTABLE DEVICE. AT THIS TIME, SPECIFY A POSITION OF THE PORTABLE DEVICE AND ITS MOTION.

3. LEAVE VEHICLE WHILE HOLDING THE PORTABLE DEVICE. AT THIS TIME, DETECT THE USER GETS OFF THE VEHICLE, FROM THE PORTABLE DEVICE'S MOTION.

4. THE STATIONARY DEVICE CANNOT COMMUNICATE WITH THE PORTABLE DEVICE, AND RECOGNIZES THAT THE PORTABLE DEVICE IS NOT WITHIN THE CABIN, AND LOCKS THE DOOR.

RADIO SYSTEM

CROSS-REFERENCE TO RELATED PATENT APPLICATIONS

Japan Priority Application 2000-260658, filed Aug. 30, 2000 including the specification, drawings, claims and abstract, is incorporated herein by reference in its entirety.

BACKGROUND OF THE INVENTION

1. Field of the Invention

The present invention relates to a radio system, which enables operations of an entry system, an engine control system and the like for the vehicle (e.g., unlocking operation of the doors, and permission of engine start) to be performed without bothersome operations by the user.

2. Description of the Related Art

An example of a system including this type of radio system is a smart entry system for use with a vehicle, recently emerged in the market. This system is developed from the keyless entry system, and is also called a passive or hands free entry system. This system includes a portable device that may be carried by a user, and a stationary device (in this case, it is a device mounted on a vehicle) mounted on the vehicle at side of an object to be controlled (in this case, it is a vehicle side). The authentication codes (also called ID codes or key codes) are automatically verified by a wireless communication between those parties. If those codes are coincident with each other, predetermined operations (locking and unlocking operations) of the object to be controlled (in this case, a lock device for the vehicle door) is automatically realized.

In the general keyless entry system, the user operates a specific button of a portable device. In response to the button operation, a specific operation signal (e.g., an unlocking command for unlocking the door) containing an authentication code is wirelessly transmitted from the portable device to a stationary device. Upon receipt of the authentication code, the stationary device compares the received authentication code with an authentication code preset in the stationary device (i.e., verifies the received authentication code). Then, if those codes are coincident with each other, the stationary device outputs a predetermined signal for controlling a predetermined object to be controlled (e.g., a control signal for unlocking the vehicle door). Thus, the communication in this system is a unidirectional communication, viz.; the signals are transmitted unidirectionally from the portable device (a transmitter) to the stationary device (a receiver).

In the smart entry system, a wireless communication (bi-directional communication) for the code verification is automatically carried out when the portable device is located within a communication range within which the portable device is communicable with the stationary device (vehicle). For example, the code verification is automatically carried out when some condition (e.g., the signal output of the sensor which detects the user approaches to the vehicle) holds as trigger, or when the portable device receives a signal intermittently transmitted from the stationary device. If those codes are coincident with each other, the stationary device automatically executes a control process (e.g., a process to unlock the vehicle door being locked) in accordance with the current situation. In this case, a given operation of the controlled object is achieved without any intentional operation by the user. In this respect, this entry system is extremely high in convenience.

In such a system (having the function of the smart entry system or the functions of the keyless entry system and the smart entry system), the market demands further improvements on various items, such as added value, convenience, crime prevention and the like. With this, multifunctional features and enhancement of the function are required for the system. There is a proposal to control a plurality of objects to be controlled on the basis of the result of the verification which is performed through a wireless communication between a portable device and a stationary device. Specifically, the market demands a system (which controls a plurality of objects to be controlled on the basis of the verification carried out through the wireless communication) having the function of a called immobilizer system and the function of the smart entry system. The immobilizer system permits the vehicle engine start on the basis of the result of the conventional physical verification by the key and the result of the verification of the authentication codes.

An example of the system as demanded is such that when a user carrying a given portable device approaches to a vehicle, the vehicle door having been locked is automatically unlocked, and then when he gets in the vehicle, the immobilizer function automatically operates to permit the engine start of the vehicle (as the engine is ignited to operate by operating the ignition switch in a usual manner)

In the smart entry system as mentioned above, it is necessary to automatically lock the door after it is confirmed that the portable device is out of the vehicle. If the door is locked in a state that the portable device is placed within the vehicle cabin, the called "in lock" (the key is confined to within the cabin) occurs. This should be avoided. Further, if it is uncertain that the portable device is out of the cabin, the door is left unlocked and there is a danger that the vehicle is stolen. In the system having also the function of the immobilizer system, for the purpose of crime prevention, it is desirable that the authentication code for the locking/unlocking of the vehicle door is different from that for the engine control, and the transmission output power is selectively used. In this case, the authentication code and the transmission output power transmitted/received after it is confirmed that the user carrying the portable device gets on the vehicle must be selected for the engine control. Thus, in the smart engine system as mentioned above, it is very important to reliably determine a position of the portable device (determine as to whether the portable device is inside or outside the vehicle).

So far as we know, there is no proposal of effective technique to reliably determine a position of the portable device. Accordingly, it is very difficult to realize a quality smart entry system being almost free from the in-lock or others.

A possible approach is that antennae are provided inside and outside the stationary device, and the position of the portable device is determined depending on the antenna actually used for the communication with the portable device. This approach, however, can uncertainly determine the device position when the device is located at a delicate position inside or outside the vehicle.

Another approach is disclosed in Japanese Patent Unexamined Publication No. Hei. 11-107592. In the approach, monitor means for monitoring a reception intensity of an authentication code signal is provided on the stationary device. An intensity (absolute value) of the field strength of the signal received by a single antenna of the stationary device and detected by the monitor means is used for determining a position of the portable device (distance measured from the stationary-device side antenna). In this approach, when the portable device is located near the stationary-device side antenna, the field strength is saturated and hence does not vary. Accordingly, to clearly determine the device position outside the vehicle, it is required that the portable device is located at a position apart from the vehicle by a certain distance. Further, the position of the portable device is detected in terms of a distance measured from one antenna. Therefore, it is impossible to exactly determine the device position. When the portable device is located at a delicate position inside or outside the vehicle, the determined position is still uncertain.

SUMMARY OF THE INVENTION

An object of the present invention is to provide a radio system including a portable device and a stationary device, which can determine a position of the portable device exactly and in finer steps.

The above-mentioned object can be achieved by a radio system according to a first aspect of the invention, comprising: a portable device that may be carried by a user; and a stationary device for wirelessly communicating with the portable device. The portable device operates such that when the portable device receives first signals (portable-device finding signals) from the stationary device, the portable device sends second signals representative of reception intensity data of the first signals back to the stationary device. The stationary device sends the first signals from a plurality of stationary-device side antennae located at different positions respectively, and when the stationary device receives the second signals from the portable device through the respective stationary-device side antennae, the stationary device determines a position of the portable device by using the reception intensity data of the first signal included in the respective second signals.

According to the above-mentioned radio system, portable-device finding signals are transmitted from a plurality of stationary-device side antennae located at different positions. A position of the portable device is determined by using reception intensity data of those portable-device finding signals. Therefore, if the portable device is located close to one of the stationary-device side antennae and the reception intensity (field strength) of the portable-device finding signal from the antenna is saturated, the position determination is performed in finer steps than in the case using one antenna, by using the variation of the reception intensity of the portable-device finding signals from the other antenna. Even when the portable device is located at a delicate position inside or outside the vehicle, its position inside or outside the vehicle can be determined exactly. Such a radio system, which includes a single antenna corner and determines the position of the portable device in the terms of a distance from the antenna by using the reception intensity data from the antenna, cannot determine an absolute position of the portable device (although it can detect only whether or not the portable device approaches to the antenna). In this connection, the position determining technique of the invention is able to continuously detect a hanging position of the portable device since an absolute position of it is detected.

The "portable device finding signal" may be a signal used for the verification in the case in which the verification of a predetermined portable device is required (the signal: a request signal requesting the portable device to return an answer signal containing an authentication code). Further, it may be a signal different from the verification signal. If it is different from the verification signal, the transmission output power of the portable-device finding signal may be set at a more preferable value, independently of the verification signal. Where the verification signal is not contained in the portable-device finding signal, if the sending of the portable-device finding signal is repeated for the position determination, the criminal prevention is not hindered.

Further, the above-mentioned object can be achieved by a radio system according to a second aspect of the invention, comprising: a portable device that may be carried by a user and; a stationary device for wirelessly communicating with the portable device. The stationary device sends first signals (portable-device finding signals) from a plurality of stationary-device side antennae located at different positions. The portable device operates such that when the portable device receives the first signals from the stationary-device side antennae of the stationary device, the portable device determines a position of the portable device by using reception intensity data of the respective first signals, and sends a second signal representative of the result of the position determination back to the stationary device.

According to the above-mentioned radio system, portable-device finding signals are transmitted from a plurality of stationary-device side antennae located at different positions. A position of the portable device is determined by using reception intensity data of those portable-device finding signals. Therefore, the position determination is performed exactly and in finer steps. Further, the process of determining the device position is carried out in the portable device. This leads to simplification of the stationary device construction.

The above-mentioned object can be also achieved by a radio system according to a third aspect of the invention, comprising: a portable device that maybe carried by a user and; a stationary device for wirelessly communicating with the portable device. The portable device sends first signals (portable-device finding signals) to the stationary device. The stationary device receives the first signals by use of a plurality of stationary-device side antennae located at different positions, and determines a position of the portable device by using reception intensity data of the respective first signals.

In the radio system, the "portable-device finding signal" may be a signal used for the verification in the case on which the verification of a predetermined portable device is required (the signal: a request signal requesting the portable device to return an answer signal containing an authentication code). Further, it may be a signal different from the verification signal.

According to the above-mentioned radio system, portable-device finding signals are transmitted from a plurality of stationary-device side antennae located at different positions. A position of the portable device is determined by using reception intensity data of those portable-device finding signals. Therefore, the position determination is performed exactly and in finer steps. Further, the process of determining the device position is carried out in the stationary device. This leads to simplification of the portable device construction.

Additionally, there is no need of sending signals of a plurality of reception intensity data items and a signal representative of the result of determining the device position, from the portable device. Therefore, the scheme of the signals to be transmitted from the portable device to the stationary device for determining the portable device position is simplified.

In the above-mentioned radio systems, it is preferable that the stationary device varies the setting of the amplitude relations between the portable-device finding signals from the stationary-device side antennae, and sends portable-device finding signals, and the stationary device or the portable device determines a position of the portable device by using the reception intensity data obtained for each the setting.

Further, in the radio system, it is preferable that the stationary device receives the portable-device finding signals by varying the setting of the magnitude relations between reception intensity data items of the portable-device finding signals from the stationary-device side antennae, and determines a position of the portable device by using the reception intensity data obtained for each setting.

With such arrangements, the position determination is carried out in finer steps and more precisely by using various reception intensity data.

In each of the radio systems, the position determination of the portable device may determine a position of the portable device as viewed in the direction in which paired antennae of stationary-device side antennae are arrayed, by using the magnitude relations between the reception intensity data of the paired antennae.

Accordingly, the device position is determined by the communication result (the magnitude relations between the reception intensity data items), which is independent of a variation of the absolute value (or dispersion of the absolute values) of the transmission output power or the reception intensity in the transmission and reception of the portable-device finding signal. Therefore, the device position determination is little affected by a performance variation of the communication circuit of the portable device and the stationary device and the antennas or a dispersion of the performance values. The determination of the position of the portable device is always high in reliability. Further, to avoid the unwanted situation, e.g., the saturation of the reception intensity data, it is easy to vary the absolute value of the transmission output power or the reception intensity in the transmission and reception of the portable-device finding signal as a whole in accordance with distance from the portable device to the antennae (e.g., the transmission output power is increased when the portable device is located at a long distance from each antenna, and it is increased when the portable device is located at a near distance from each antenna).

Preferably, the stationary device is mounted on a vehicle (e.g., automobile, bicycle, small air plane). Then, the stationary device and/or the portable device judges from the position determination result that the portable device is inside or outside a vehicle, that a user carrying the portable device gets on the vehicle, or that the user gets off the vehicle.

In this case, the determination as to whether the portable device is inside or outside the vehicle and whether or not the user carrying the portable device gets off the vehicle is exact.

Further, the stationary device may be a control device which is mounted on the vehicle and communicates with the portable device to verify that the portable device is a predetermined one, and automatically executes a control process for realizing a predetermined operation of an object to be controlled (e.g., a device mounted on the vehicle which forms the smart entry system) in the vehicle.

The controlled object includes a lock device for locking and unlocking the vehicle door and/or other devices (except the lock device).

The control process contains a signal output for locking or unlocking the lock device and/or a signal output or the data setting permitting the mounted device to operate, or a signal output for instructing the mounted device to operate. The device mounted on the vehicle may be a drive power source for the engine or motor, a device for driving transmission or the like, steering device, e.g., handle, an audio system, navigation system, or air conditioner. The "the data setting permitting the mounted device to operate" means an internal process, for example, for setting a flag to permit the mounted device to operate in the information processing within the stationary device.

When judging that the user carrying the portable device got on the vehicle, the stationary device may select a kind of the controlled object or the contents of the control. In the smart entry system also having the immobilizer function, as already stated, it is preferable to confirm that the user carrying the portable device gets on the vehicle, and to change the authentication code to be sent and the transmission output power, which are for the locking/unlocking of the vehicle door, to those for the engine control. The position determining process of the invention may be applied to the judgment as to whether or not the user gets on the vehicle. If so done, the mode select is exactly performed, and hence a quality smart entry system is realized.

When the stationary device is the control device mounted on the vehicle as mentioned above, it is preferable that when judging that the user carrying the portable device got on the vehicle, the stationary device and/or the portable device selects such wireless transmission output power for the verification as to reduce a communication range (a position range of the portable device within which it is communicable with the stationary device).

In this embodiment, degradation of the crime prevention (against the stealing of the authentication code), due to the radiation of a signal containing the authentication code for the verification in such a broad range that it may be received in an area around the vehicle although the user carrying the portable device is within the vehicle, is avoided without fail.

Particularly, in such a device that the transmission output power selecting process changes the wireless communication range for the verification from the relatively broad remote control range including positions outside the vehicle, which are remote from the vehicle by predetermined distance, to the narrow range within the vehicle (may contain an area near the vehicle), the communicable range is always within the least, but necessary range. Accordingly, good crime prevention is secured against the authentication code stealing while keeping good convenience.

Further, the selecting of the controlled object and the selecting of the wireless transmission output power for the verification may be both carried out. Specifically, when the position determining process confirms that the user carrying the portable device gets on the vehicle, the stationary device changes the controlled object from the lock device to the mounted device (engine or the like). Further, the stationary device and/or the portable device selects the wireless transmission output power for the verification so that wireless communication range for the verification is changed to the narrow range.

The selection process of the transmission output power may be carried out for the portable device and/or the stationary device.

The selection process may be executed such that every position of the portable device, a corresponding transmission output power value is selected and read from nonvolatile memory which previously stores the transmission output power value for each position of the portable device. In some case (case where the load of the control process is not in question), it is preferable that the transmission output power is adjusted to the least, but necessary communicable value when it is selected (details of the output adjustment will be described in detail in the description of the preferred embodiments).

In a case where the stationary device is mounted on the vehicle, the plurality of antennae are respectively located on both side corners of the vehicle as viewed in the direction in which the user gets on or off the vehicle (the direction: a direction in which the passenger gets on and off the vehicle, and which is normally perpendicular to the vehicle advancing direction). With such an arrangement, the determination as to whether the portable device is inside or outside the vehicle and whether the user gets on or off the vehicle is exactly and easily carried out on the basis of the magnitude relations between the reception intensity data between the stationary-device side antennae located on both side corners.

In a case where the transmission output power of the portable-device finding signal and the reception sensitivity of the antenna are fixed in value for each antenna, if the reception intensity data of one antenna is substantially equal to that of the other antenna, it may be considered that the portable device or the user is positioned at the center (the center of the vehicle) as viewed in the getting-on and off directions. When the reception intensity data of one antenna is somewhat larger than that of the other antenna, it may be considered that the portable device or the user is located at a position closer to one of the antennae in the getting-on and off directions (usually, near the vehicle door). If the reception intensity data of one antenna is considerably larger than that of the other antenna, it may be considered that the portable device or the user is located at a position outside the vehicle and on one of the side of the vehicle as viewed in the getting-on and off directions. Thus, whether the portable device is inside or outside the vehicle and whether or not the user carrying the portable device gets on the vehicle are easily and exactly judged on the basis of the comparison of the reception intensity data items.

BRIEF DESCRIPTION OF THE DRAWINGS

FIG. 2 is a table showing the principle to determine a position of a portable device;

FIG. 3 is a diagram showing position areas for determining a position of a portable device;

FIGS. 4A and 4B show tables for explaining the data for determining a position of the portable device;

FIGS. 8A-8C are diagrams showing a first use of the radio system (at the time of getting on);

DETAILED DESCRIPTION OF THE PREFERRED EMBODIMENT

The preferred embodiments of the present invention will be described with reference to the accompanying drawings.

First Embodiment

A first embodiment of the present invention will first be described. In the embodiment, the present invention is applied to a radio system for an entry system and an engine control system (with the immobilizer function) in a motor vehicle 1 of the two door type, as shown in FIG. 1B.

Figure 1A:
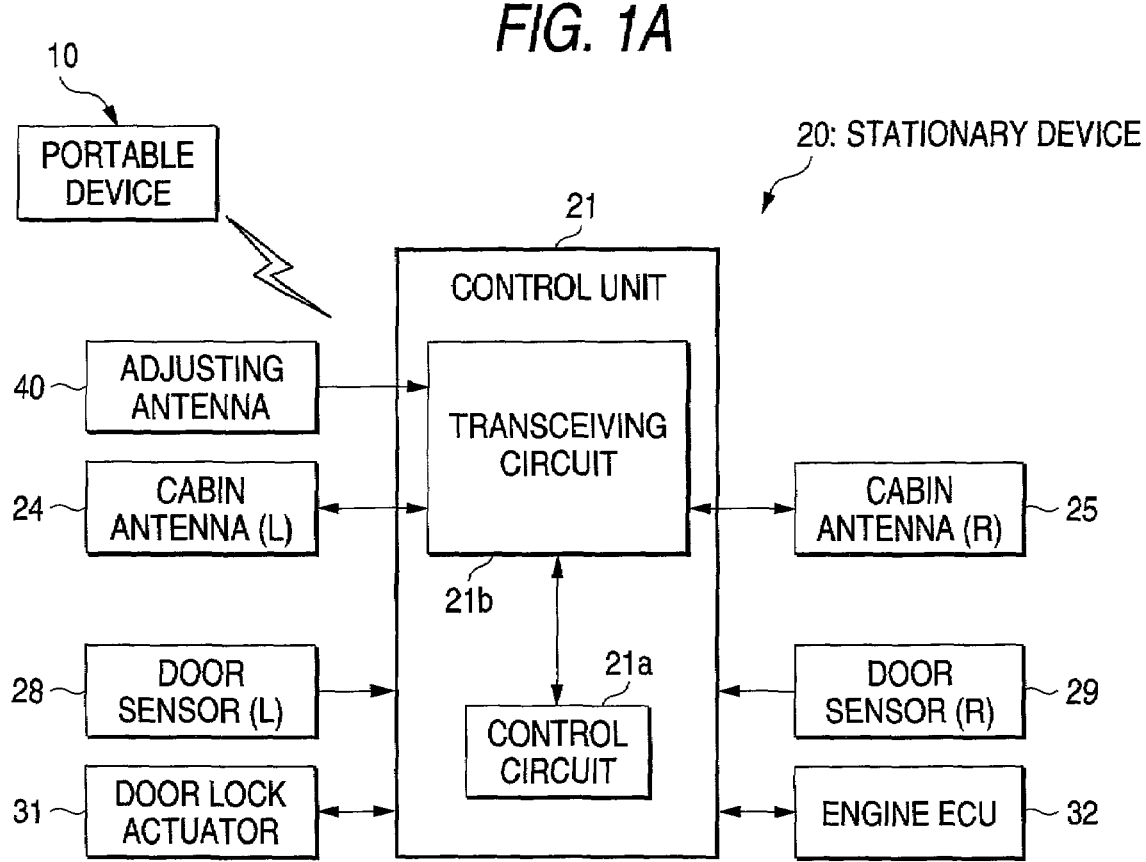
FIGS. 1A and 1B are block diagrams showing an overall arrangement of a radio system (smart entry system)
Figure 1B:
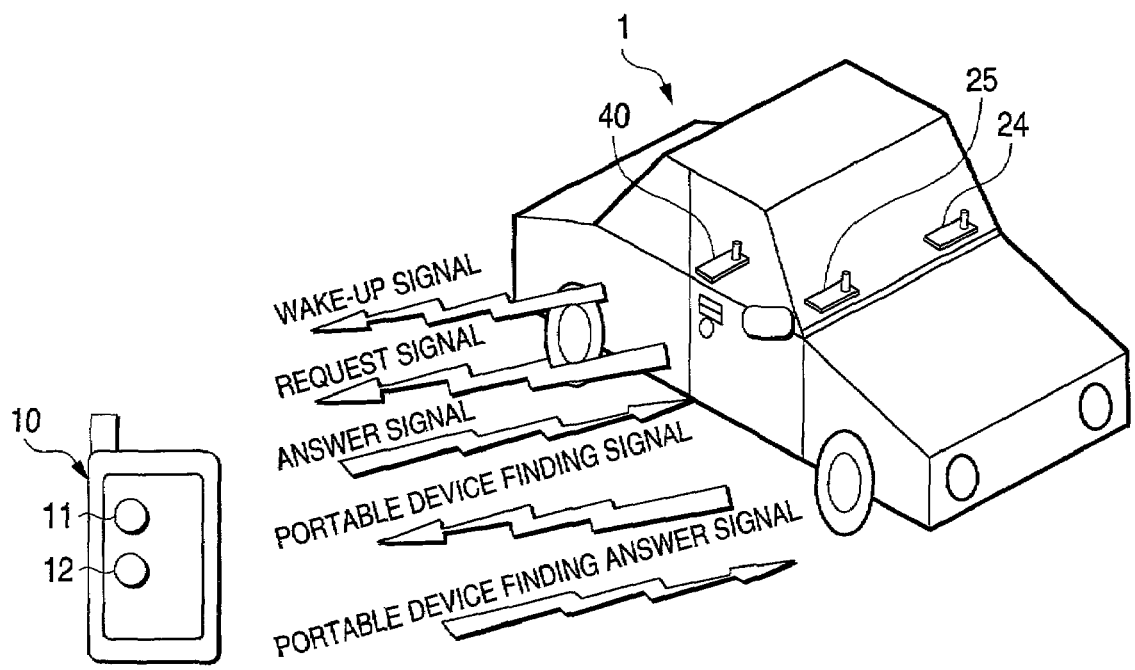

The radio system, as shown in FIG. 1A, includes a portable device 10, a stationary device 20 mounted on the motor vehicle 1, and an adjusting antenna 40 for adjusting a transmission output power.

In FIG. 1A, reference numerals 28 and 29 are door sensors for sensing the opening and closing of the right and left doors of the motor vehicle 1. Reference numeral 31 is a door lock actuator as a drive power source for a door lock device of the motor vehicle 1. Reference numeral 32 is a control unit for an engine control system of the motor vehicle 1.

Those sensors 28 and 29 are used for triggering the position determining process of the portable device and the selecting (adjusting) process of the transmission output signal.

The portable device 10 includes power receiving means (not shown), portable-device side communication means (including an antenna and a transceiving circuit; not shown), reception intensity measuring means (not shown), a control circuit (not shown), a built-in battery (not shown), a power source circuit (not shown), and power-source control circuit (not shown). The power receiving means receives electric power (wake-up signal) in a non-contact manner by electromagnetic wave. The portable-device side communication means performs a wireless communication by using a communication frequency (e.g., a frequency within the UHF frequency band), which is different from a frequency (e.g., 100 to 200 kHz) used for power transmission. The reception intensity measuring means detects a field strength of a signal received by the portable-device side communication means. The control circuit includes a microcomputer (referred to as a micon) which performs the control processing of the overall portable device and stores authentication codes and the like. The power source circuit supplies electric power from the battery to power consuming elements (the portable-device side communication means, the control circuit and the like). The power-source control circuit performs a power-source control on the electric power transmission (reception of the wake-up signal). A locking switch 11 and an unlocking switch 12 (see FIG. 1B), which are push buttons, are provided on an operation surface of the portable device 10.

The control circuit of the portable device 10 includes a nonvolatile portable-device side storage means (e.g., $E^2PROM$; not shown), which is rewritable and erasable, for the storing means for storing authentication codes and the like. The power source control circuit is triggered by electric power (wake-up signal) received by the power receiving means to shift the mode of the control circuit from a sleep mode (little consuming electric power) to a normal mode (not sleep mode). In this case, the shifting of the control circuit from the normal mode to the sleep mode is performed through a control process of the control circuit per se. When the locking switch 11 or the unlocking switch 12 is operated, the control circuit shifts from the sleep mode to the normal mode if necessary, and accepts an operation of the switch.

The control circuit of the portable device 10, in a normal mode, has a function to perform the following processing operations by setting an operation program to its the micon.

As shown in FIG. 1B, when the portable device, which is in an operating state, wirelessly receives a request signal from the stationary device 20, it sends to the stationary device through a transceiving circuit, an answer signal. The answer signal contains a control mode at that time, which is one of authentication codes (for door locking control, engine start/stop control and output adjustment), which are previously registered in the portable-device side storage means. When a portable-device finding signal from the stationary device 20 is received by the portable-device side communication means, the portable device sends (returns) a portable-device finding answer signal to the stationary device by the portable device communication means. The portable-device finding answer signal contains reception intensity data detected by the reception intensity measuring means and antenna identifying codes (to be described later) contained in the received portable-device finding signal. Further, in response to a mode select signal from the stationary device 20, the portable device changes a control mode from a door lock control mode to an engine start/stop control mode, and performs an output adjustment (this will be described in detail later).

When the locking switch 11 or the unlocking switch 12 is operated, the portable device sends a locking command signal containing a door locking control authentication code, or an unlocking command signal containing the same in a wireless manner. When the stationary device 20 receives the locking command signal or the unlocking command signal from the portable device, the stationary device 20 verifies the received signal, and then the door of the motor vehicle 1 is locked or unlocked. Thus, the radio system including the portable device 10 and the stationary device 20 has the same function as of a general radio system or the keyless entry system (of the unidirectional communication type already described).

As shown in FIG. 1A, the stationary device 20 includes a control unit 21 and cabin antennae 24 and 25. For the antennae of the stationary device, the cabin antennae may be substituted by outside antennae or the cabin antennae and outside antennae may be both used.

In this instance, the cabin antennae 24 and 25 are installed at both side positions in the front part of the cabin of the motor vehicle 1 (e.g. on the instrument panel). The adjusting antenna 40 is provided at a position near the window (near the pillar) in the cabin of the motor vehicle 1.

The cabin antennae 24 and 25 are used for the wake-up signal transmission (power transmission) and the normal signal transmission/reception (wireless communication by using the communication frequency already referred to). If required, an antenna exclusively used for the normal signal transmission/reception and another antenna exclusively used for the power transmission may be used separately.

The control unit 21 includes a control circuit 21a, a transceiving circuit 21b, and a circuitry (not shown). The portable-device finding answer signal contains a micon. The transceiving circuit 21b transmits electric power and wirelessly transmits and receives signals at the communication frequency. The circuitry includes a power source circuit, a timer circuit for intermittent driving.

The transceiving circuit 21b and the circuitry including the power source circuit are not essential to the present invention, and known circuits may be employed for the invention. The control circuit 21a contains a micon, and storage means for storing authentication codes and the like, which is rewritable and erasable nonvolatile stationary-device side storage means (e.g., E$^2$PROM; not shown . The control circuit 21a is intermittently driven by the timer circuit already referred to, whereby its power consumption is minimized.

The control circuit 21a has a function to execute the following processing operations by setting operation programs to its micon.

Specifically, every time it is driven by the timer circuit, the transceiving circuit 21b sends to the portable device a predetermined electric power which will serves as a wake-up signal of the portable device 10 (FIG. 1B). Then the transceiving circuit 21b sends a request signal to requesting the return of an answer signal to the portable device in a wireless manner. When the stationary device receives the answer signal from the portable device 10 after sending the request signal, it judges whether or not an authentication code contained in the answer signal corresponds to an authentication code previously registered in the stationary-device side storage means. If the result of the judgment is affirmative, it recognizes that the authentication codes are coincident with each other, and executes a predetermined process based on the current control mode (the detail of this will be described later). The control circuit 21a of the stationary device 20 operates for determining the current position of the portable device 10 at a predetermined timing (as will be described later).

The operation and principles of determining a position of the portable device 10 in the radio system will be described. The determination of a position of the portable device 10 will be made in the following manner.

To start, such a communication that portable-device finding signals respectively containing different antenna identification codes are concurrently or sequentially emitted from either of the cabin antennae 24 and 25 under control of the control circuit 21a of the stationary device 20, and the portable-device finding answer signals that are returned from the portable device 10 are received, is repeated for the following three conditions (output power setting conditions).

The antenna identification codes are used for identifying which of the cabin antennae 24 and 25 is used for sending the signal.

The three conditions are: (1) Pt(D)>Pt(A), (2) Pt(D)=Pt(A), and (3) Pt(D)<Pt(A), where Pt(D) is a transmission intensity at the cabin antenna 25 on the drive's seat side (indicated by "'D"), and Pt(A) is a transmission intensity at the cabin antenna 24 on the assistant driver's seat side (indicated by "'A"). In FIG. 2, D1 and A1 indicate the first condition; and D2 and A2, and D3 and A3 indicate the second and third conditions.

It is required that an absolute value of the transmission output power of the portable-device finding signal is set at such a value as not to saturate the reception intensity data, if possible, even when the portable device 10 is within the cabin. Preferably, the absolute value of the transmission output power of the portable-device finding signal is adjusted to be a minimum value in accordance with the position of the portable device 10 (distance from each of the cabin antennae 24 and 25 or it is within or outside the cabin), each time it is done.

The portable-device finding signal contains condition codes as well as the antenna identification code. The condition codes are each used for specifying which of the three conditions was used for the portable-device finding signal communication.

In the communication, every time the portable device 10 receives the portable-device finding signals containing antenna identifying codes received from the cabin antennae 24 and 25, reception intensity data (an absolute value, in this case) of the portable-device finding signal, and a portable device finding answer signal containing the antenna identifying code and the condition codes, which are contained in the portable-device finding signal received are returned by the portable-device side communication means.

Thereafter, the control circuit 21a of the stationary device 20 judges to find a position area, which the portable device 10 is located therein, from those position areas being present as viewed in the getting-on and off direction (vehicle width direction) of the motor vehicle 1, on the basis of a total of six reception intensity data items E (D1), E (A1), E (D2) E (A2), E (D3), E(A3) thus obtained. In the embodiment, nine position areas are provided as shown in FIGS. 2 and 3: outside the vehicle on the driver's seat (Dout), near the door (Dd) on the driver's seat side, center of the driver's seat (Dc), near the center of the vehicle (Dcc) on the driver's seat side, on the center line of the vehicle (C), near the center of the vehicle (Acc), center of the assistant driver's seat (Ac), near the door (Ad) on the assistant driver's seat side, and outside the vehicle on the assistant driver's seat (Aout). With this, fine position determination, which is preferable in determining whether the portable device 10 is present inside and outside of the vehicle, is made depending on the reception intensity data magnitude.

Specifically, where the first condition, Pt (D1)>Pt (A1), is set up, if the portable device 10 is located on the center line of the vehicle (C), the reception intensity data items satisfy E(D1)>E(A1). If it is located on the center of the assistant driver's seat (Ac), the data items satisfy E(D1)=E(A1). If it is located near the door (Ad) on the assistant driver's seat side, E(D1)<(A1). For the remaining conditions, as seen from FIG. 2, the amplitude relation of the reception intensity data items at the antennae varies in accordance with a position area in which the portable device 10 is present, as a matter of course. If the data item amplitude relations are classified into five modes (mode 1 to mode 5) (FIG. 4A), combinations of those modes on the three conditions (mode combinations) are related to the position areas in one-to-one correspondence (FIG. 4B). Therefore, the current position of the portable device 10 can definitely be determined in a manner that the six reception intensity data items are compared for each condition to obtain mode combinations, and those combinations are applied to the relations shown in FIG. 4B.

Operations of the radio system (entry system and immobilizer system) will be described together with the control processes of the portable device 10 and the stationary device 20.

Figure 5:
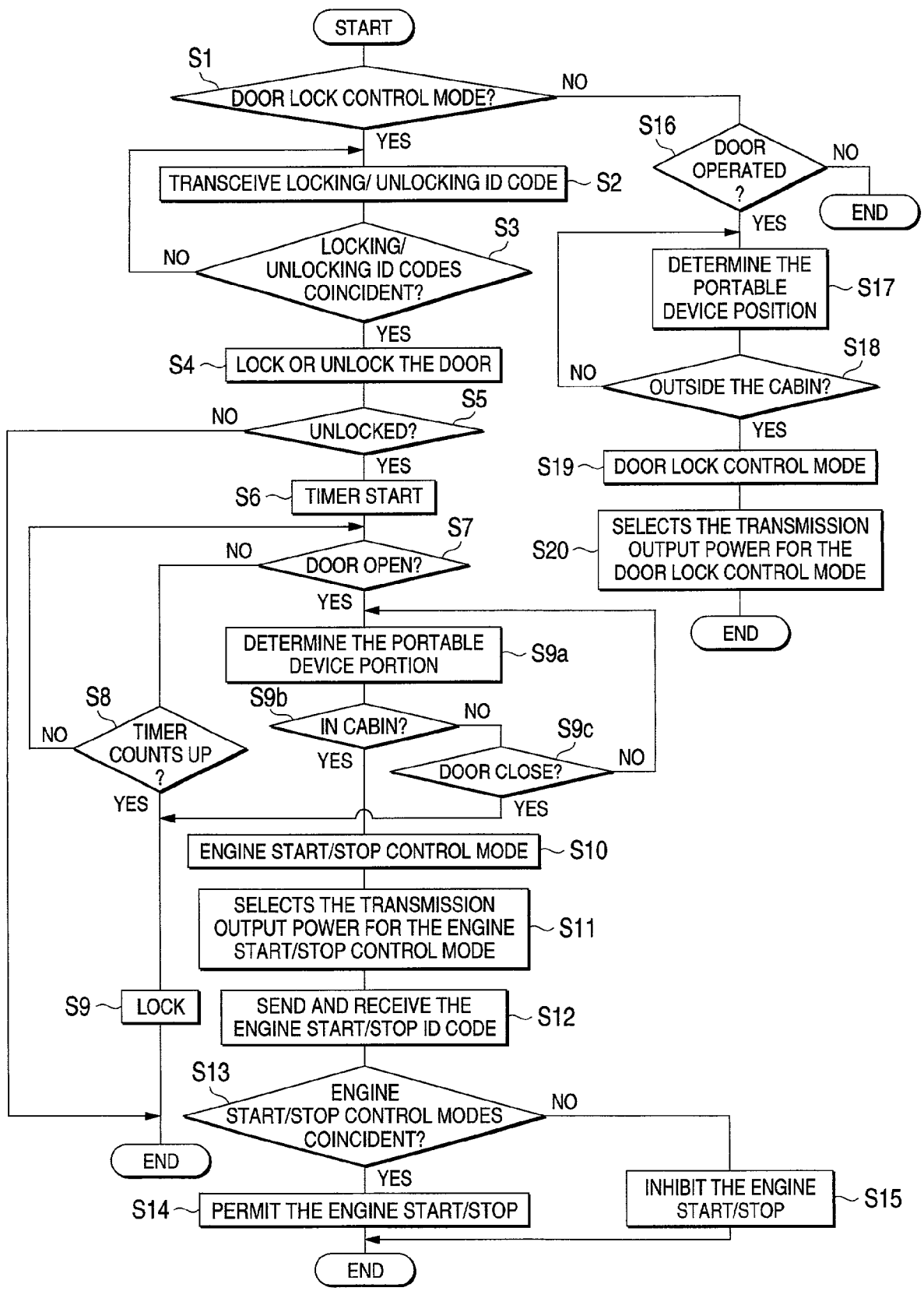
FIG. 5 is a flow chart showing an overall operation of the radio system.

FIG. 5 is a flow chart showing an operation flow of the radio system.

To first, a step S1 is executed to check as to whether or not a control mode is a door lock control mode, as a result of a process (a process by the control circuit 21a) of the stationary device 20. In an initial state, the door lock mode has been set up. The door lock control mode is a control mode for executing the locking and unlocking control of the door (the control of the entry system). In the door lock control mode, the transmission output power of the portable device 10 and the stationary device 20 takes at relatively large initial values suitable for the entry system (values for providing a relatively broad range with which a remote control communication is possible).

When in the door lock control mode, a predetermined electric power to be a wake-up signal is transmitted from the stationary device 20. When the portable device 10 is located within the remote-control communication range and it receive the wake-up signal, the mode of the control circuit of the portable device 10 shifts from a sleep mode to a normal mode. A request signal that is subsequently transmitted from the stationary device 20 is also received by the portable device 10. In turn, a step S2 is executed in which in response to the request signal, the portable device 10 processes under control of its control circuit and sends an answer signal containing a door lock control authentication code (locking/unlocking ID code).

When the locking switch 11 or the unlocking switch 12 of the portable device 10 is operated, the step S2 is also executed.

In this case, a locking command signal containing the door lock control authentication code or an unlocking command signal containing the same authentication code is sent under control of the control circuit of the portable device 10.

In this case, after the answer signal, the locking command signal or the unlocking command signal are transmitted, the control circuit of the portable device 10 resumes its sleep mode to save consumption power.

The answer signal, the locking command signal or the unlocking command signal, as a matter of course, are received by the stationary device 20 if those signals come from the portable device located within the remote-control communication range and unless some trouble, e.g., abnormal drop of the transmission output power of the portable device 10, occurs. Upon receipt of the answer signal, the control circuit 21a of the stationary device 20 compares the door locking control authentication code contained in the received answer signal or the like with the door locking control authentication code stored in the stationary-device side storage means, and judges whether or not those codes are coincident with each other (step S3).

If those codes are coincident with each other, the control circuit 21a controls the door locking/unlocking operation in accordance with a situation at that time. In this case, when the reception intensity data of the received answer signal takes a value in excess of a predetermined value and the door is in a locked state (it is estimated that the user approaches to the locked door of the vehicle), or when the received signal is an unlocking command signal, a control signal for instructing the door lock actuator 31 to operate for unlocking is sent to the door lock actuator 31. When the reception intensity data of the answer received signal takes a value smaller than the predetermined value (or when the stationary device 20 is changed from a state that it can receive the answer signal to a state that it cannot receive the answer signal) and the door is in an unlocked state (it is assumed that the user leaves the unlocked door of the vehicle), or when the received signal is a locking command signal, a control signal for instructing the door lock actuator 31 to operate for locking is sent to the door lock actuator 31 (step S4).

When a locking/unlocking control executed under control of the control circuit 21a is a locking operation (outputting a control signal for instruction a locking operation), the sequence of the operations ends, and the process starting with the step S1 is executed again (step S5). When the locking operation is executed, the operation to determine the position of the portable device 10 is preformed, by way of precaution, before the sequence of operations. In this case, when the portable device 10 is located within the cabin, an alarm (to sound a horn or to light on the lamp) is issued. Or the door is forcibly unlocked so as to prevent the in-lock of the portable device 10 without fail.

When the locking/unlocking control executed under control of the control circuit 21a is an unlocking operation (outputting a control signal for instructing an unlocking operation), the control circuit 21a of the stationary device 20 starts a time counting operation of a timer which is previously set (step S6). Several minutes, for example, will suffice for a set time of the timer.

Thereafter, the control circuit 21a receives the output signals of the door sensors 28 and 29, and judges whether or not the door is opened (step S7). If any of the doors is not opened till the timer counts up (till a set time of the timer elapses from the unlocking operation), the locking control (to output a control signal for instructing the door lock actuator 31 to operate for locking) is executed to lock the door of the motor vehicle 1 (steps S8 and S9). This operation is such that since the unlocking operation is executed, but the door is not opened, it is judged that an unnecessary unlocking operation is performed, and the door is automatically locked for securing a crime prevention.

When it is judged that the door was opened till the timer counts up, a process of determining the portable device 10 position is executed (step S9a). Judgment is made as to whether or not the portable device 10 enters the cabin from outside (the user carrying the portable device 10 got in the cabin of the motor vehicle 1), on the basis of the position determining result (step S9b). When the position of the portable device 10 is changed from the area Dout to the area Dd, and further to the area Dc, it may be considered that the portable device entered the cabin. In this case, the device position determining process (the transmitting and receiving the portable-device finding answer signal, the comparing of the reception intensity data magnitudes, and the like) is repeated till it is judged that the portable device 10 entered the cabin or that the door once opened is closed (step S9b and S9c). When it is judged that the door is closed before it is judged that the portable device 10 enters the cabin, the step S9 is executed to lock the door for securing a crime prevention, and the execution of the subsequent sequential operation is ended (step S9c and S9).

When the portable device 10 is left outside the vehicle and the door is left open during the execution of the steps S9a and S9b, the operation will not progress forever (the position determining operation will be repeated forever). This may be avoided with such an arrangement that when a predetermined time elapses in a state that the portable device 10 is left outside the vehicle and the door is left open, a sequence of process steps (during the next process cycle, the sequential operation starting with the step S1 is repeated) is ended under control of the control circuit 21a.

When it is judged that the portable device 10 entered the cabin, it may be estimated that the user carrying the portable device 10 entered the cabin of the motor vehicle 1. Accordingly, the control circuit 21a of the stationary device 20 shifts the control mode to the engine start/stop control mode, and sends again a wake-up signal to the portable device 10 and then sends to it a mode select report signal for reporting a mode select. Further, the control circuit 21a selects such an output power of the tranceiving circuit 21b as to be suitable for the engine start/stop control mode. The control circuit of the portable device 10 which has shifted its mode from the sleep mode to the normal mode in response to the wake-up signal and has received the mode select report signal, also selects such transmission output power of the transceiving circuit as to be suitable for the engine start/stop control mode (step S10, S11).

Incidentally, the transmission output power selecting operation is to merely change the transmission output power of the transceiving circuit 21b and the like from its initial value to a relatively small value (e.g., such a value as to limit the communication area to within a relatively narrow area including the cabin and its periphery), which is preset for the engine start/stop control mode. Of the output power of the stationary device 20 and the portable device 10, the transmission output power of the power transmission signal (i.e., the wake-up signal) and the transmission output power of the device position determining signal (portable-device finding signal and the portable-device finding answer signal) are not always changed for selection. The reason for this is that there is no need of putting the authentication codes, which may raise a question in crime prevention, in those signals. The transmission output power of the portable-device finding signal may decrementally be adjusted in order to avoid the saturation of the reception intensity data without fail.

The transceiving circuit 21b of the stationary device 20 checks if the door once opened is closed again within the set time before a step S10 (after the step S9b). If it is not closed again within the set time, the step subsequent to the step S10 and the subsequent ones are not executed and the sequence of steps may be ended. This step is taken for the following reason. When the user A (FIG. 8) gets in the motor vehicle 1, a common practice is to open the door and then to close the door. After this user's behavior is confirmed, the engine start/stop control is carried out.

When, as mentioned above, the control mode is selected and the output power adjustment is carried out (mere selection of the output power in this case), a predetermined electric power which will be the wake-up signal is sent again from the stationary device 20, the control circuit of the portable device 10 shifts its mode from the sleep mode to the normal mode. Thereafter, when the portable device 10 receives a request signal from the stationary device 20, the control circuit of the portable device 10 responds to the request signal and forms an answer signal containing engine start/stop control authentication code (engine start/stop control ID code), and it is transmitted from the portable device 10 (step S12).

In this case, after the answer signal is transmitted, the control circuit of the portable device 10 executes its control process and returns to the sleep mode.

Thereafter, as already referred to, the answer signal transmitted is received by the stationary device 20 unless some trouble, e.g., abnormal drop of the transmission output power of the portable device 10, occurs. The control circuit 21a of the stationary device 20 compares the engine start/stop control authentication code contained in the answer signal received with that stored in the stationary-device side storage means, and checks if those codes are coincident with each other (step S13).

If those codes are coincident with each other, the control circuit 21a outputs a signal permitting the engine start/stop to the control unit 32 of the engine control system, and hence a state that the engine start/stop is permitted is set up (step S14). If those codes are not coincident, the control circuit 21a sends a signal for inhibiting the engine start/stop to the control unit 32 of the engine control system, and a state that the engine start/stop is inhibited is maintained (step S15).

In a state that the engine start/stop is permitted, the engine start/stop is possible by a normal key operation (operation of the ignition key switch). In a state that the engine start/stop is inhibited, the engine start/stop is impossible only by the normal key operation.

In a state that the engine start/stop is permitted, it should be arranged for the sake of crime prevention such that under control of the control circuit 21a, the engine start/stop permission is automatically removed (i.e., the engine start/stop inhibition is set up) when the door is opened after the engine stops and then is closed (it is estimated that the user gets off the vehicle), or when a step S18 judges that the portable device 10 is carried out of the vehicle.

As described above, after the engine start/stop control mode is set up, the step S1 in the next processing cycle is executed and a step S16 is executed. In this step, the control circuit judges as to whether or not the vehicle door is operated (e.g., it having being closed is opened). When the door remains opened or closed after the engine start/stop control mode is set up, nothing is executed and the sequence of steps ends (i.e., the engine start/stop control mode is maintained).

When the door having been closed is opened (or the door having been opened is closed) after the engine start/stop control mode is set up, the process of determining the position of the portable device 10 is executed again (step S16, S17). When the position determining result is that the portable device 10 is carried out of the vehicle (or is present outside the vehicle), the control circuit 21a of the stationary device 20 changes the control mode from the engine start/stop control mode to the door lock control mode, sends a wake-up signal to the portable device 10, sends a mode select report signal for reporting the mode select, and selects the transmission output power of the transceiving circuit 21b for suitable for the door lock control mode (step S19, S20). In response to the wake-up signal, the portable device is changed form the sleep mode to the normal mode. The control circuit having received the mode select report signal also selects the transmission output power of the transceiving circuit of the portable device 10 suitable for the door lock control mode (step S19, S20). When the position determining result is that the portable device 10 is not carried out for the vehicle (i.e., the portable device 10 is left within the cabin), the device position determining process (step S17) is repeated.

The judgment of the step S18 as to whether or not the portable device 10 is carried out for the vehicle should exactly be made in the follow manner. When the position of the portable device 10 is changed from the area Dc to the area Dd and further to the area Dout, the judgment that the portable device is carried out of the cabin is correct.

When the portable device 10 is still located in the cabin during the processing of the steps S17 and S18, no further progress of the process execution is made (the device position process execution is repeated forever). To avoid this, it is arranged such that after a predetermined time elapses in a state that the portable device 10 is left within the cabin, the execution of the sequence of steps is ended (the process is started again from the step S1) or the step S12 and the subsequent ones are executed again.

As described above, when the radio system of the embodiment is used, as shown in FIGS. 8A-C, the user remotely controls the locking/unlocking operation of the door of the motor vehicle 1 without any bothersome key operation. Further, after the door of the motor vehicle 1 is unlocked, the user is permitted to start and stop the engine in a hands free manner.

Specifically, even when the user A is located apart from the motor vehicle 1, if the user A is within the remote control communication range, the control operation of the steps S1 to S4 is carried out, so that, as shown in FIG. 8A, the door of the motor vehicle 1 is automatically unlocked through the verifying process by the smart entry function (in this case, no operation is required), or is automatically locked or unlocked through the verifying of the door of the motor vehicle 1 by operating the locking switch 11 or unlocking switch 12.

When after the door of the motor vehicle 1 is unlocked, the user A opens the door and gets on the motor vehicle as shown in FIGS. 8B and 8C, the control operation of the steps S7 to S14 is carried out, so that the getting-on action of the user A is reliably judged on the basis of the determining process of the position of the portable device 10, and then the mode select is executed. As a result, the function of the immobilizer system is automatically executed (in this case, the start/stop permission of the engine based on the verifying process).

Figure 9A:
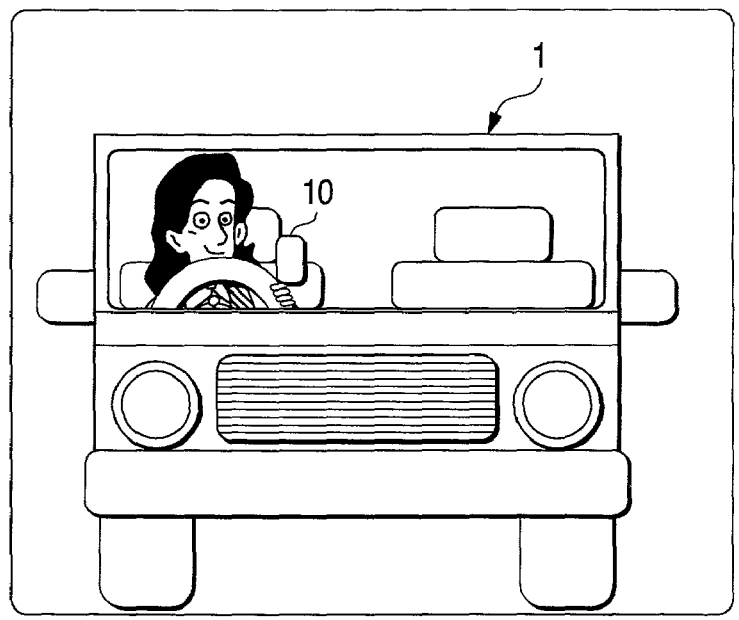
FIGS. 9A and 9B diagrams showing a second use of the radio system (at the time of getting off)
Figure 9B:
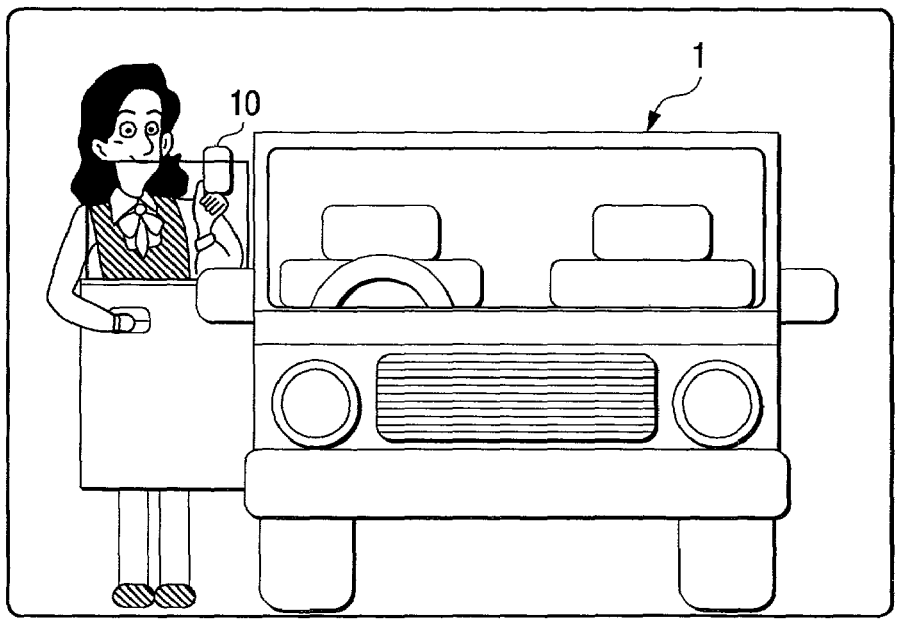
Figure 10A:
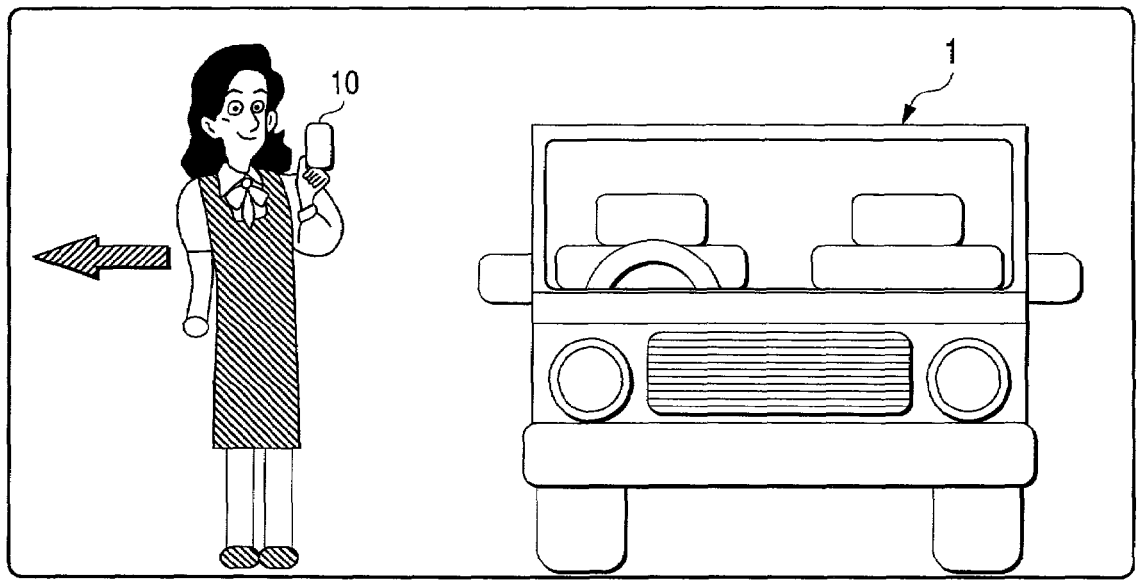
FIGS. 10A and 10B diagrams showing a third use of the radio system (at the time of getting off).
Figure 10B:
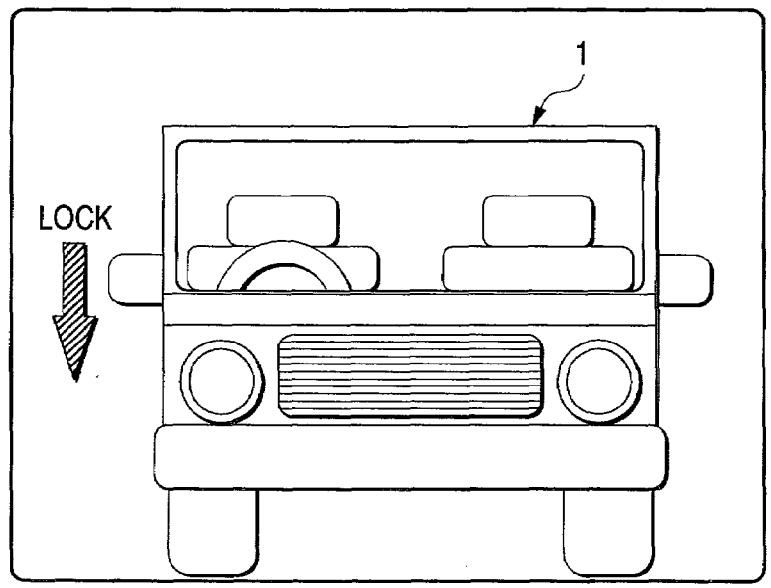

After driving the motor vehicle 1, the user A stops the vehicle (FIG. 9A), and gets off the vehicle (FIG. 9B). At this time, the control operation of the steps S16 to S29 is performed and the getting off of the user A is reliably confirmed through the process of determining the position of the portable device 10. The mode select process is executed. The function of the smart entry system (in this case, automatic locking of the motor vehicle 1 door based on the verifying process) is automatically executed through the control operation of the steps S1 to S4. In other words, when the user A gets off the motor vehicle 1 and leaves the vehicle (FIGS. 10A and 10B), the door is automatically locked when it comes to be incommunicable (it cannot receive the answer signal).

The fact that the portable device 10 is located in the cabin is determined by the control circuit 21a of the stationary device 20 by the process of determining whether the portable device 10 is within or outside the vehicle (steps S9a and S9b, and S17 to S18). When the portable device 10 is within the vehicle, the engine start/stop control mode is maintained for the control mode by the process of the steps S10 and S18.

It is certain that the locking/unlocking operation (step S4) in the door locking control mode is not carried out. Accordingly, there is no chance that as the result of the locking operation by the door locking control mode, the called "in-lock" state is set up (the portable device 10 is confined to within the cabin). As already stated, the in-lock may be avoided with such an arrangement when the locking operation is executed in the step S4, the operation to determine the position of the portable device 10 is preformed, by way of precaution, after the step S5, for example, and if the portable device 10 is left in the cabin, an alarm is issued. No description has been made about a case where the vehicle door is locked with a normal mechanical key. Also in this case, the in-lock trouble of the portable device 10 as the result of using the normal key can be avoided in a manner that the process of determining the position of the portable device 10 is carried out under control of the stationary device 20, and if the portable device 10 is left in the cabin, an alarm is issued.

The radio system of the invention realizes the function of the entry system (the object to be controlled is the locking device of the motor vehicle 1) and the function of the immobilizer system (controlled object is the engine control system of the motor vehicle 1), with a simple arrangement in which communication means are provided respectively in the portable device 10 and the stationary device 20. With such a simple arrangement, the controlled object is appropriately selected in accordance with current situation, and a communication range is appropriately set up depending on the controlled object. Accordingly, the invention succeeds in providing a quality radio system (a smart entry system also serving as the immobilizer system) which secures both the crime prevention and the convenience in good conditions.

Specifically, the control mode (the controlled object) is exactly selected based on the exact judgment as to whether the portable device 10 (viz., the user A) is inside or outside the vehicle, which is made by the control operation of the steps S9a to S11, and S17 to S20. Further, the transmission output power is exactly selected based on the control mode (controlled object). In this case, a relatively large transmission output power (broad communication range) is selected for the door lock control mode serving as the entry system. For the engine start/stop control mode serving as the immobilizer system, the least transmission output power (narrow communication range) necessary for the communication only within the cabin is selected. For this reason, the respective function (the smart entry function, the immobilizer function or the like) is appropriately selected and exactly exercised in accordance with current situation. The transmission output power (or the communication range) of the portable device 10 or the stationary device 20 for the communication using signals containing authentication codes necessary for crime prevention is appropriately changed to the least output power necessary for securing the convenience, whereby the convenience and the crime prevention are both secured in high level.

In the radio system of the invention, portable-device finding signals are transmitted from a plurality of (two in the embodiment) the stationary-device side cabin antennae 24 and 25, which are located at different positions, to the portable device. A position of the portable device 10 is determined by using the reception intensity data of the portable-device finding signals at the portable device. Therefore, if the portable device 10 is located close to the cabin antenna 24 and a reception intensity of the portable-device finding signal from the cabin antenna 24 is saturated, a magnitude difference of the reception intensity data appears without fail since a reception intensity (field strength) of the portable-device finding signal from the cabin antenna 25 varies. Accordingly, the position determination as mentioned above is performed in very fine steps. Therefore, even if the portable device 10 is located at a delicate position inside or outside the vehicle, it is possible to determine whether the portable device 10 is located inside or outside the vehicle. Such a radio system which includes an antenna located at a corner and determines the position of the portable device 10 in the terms of a distance from the antenna by using the reception intensity data from the antenna, cannot determine an absolute position of the portable device 10 (although it can detect only whether or not the portable device 10 approaches to the antenna). In this connection, the position determining technique of the invention is able to continuously detect a changing position of the portable device 10 since an absolute position of it in the direction in which the user gets on and off the motor vehicle 1 (width direction) is detected as described above. Accordingly, it is easy to detect whether the user having the portable device 10 gets on or off the motor vehicle 1, or just move inside the vehicle. Further, it can obtain the information about the position and behavior of the portable device 10, which is useful in realizing the quality function of the systems as mentioned above.

Particularly, the present embodiment uses, in communication, a portable-device finding signal as a signal being different from the verifying signals (the request signal and the answer signal. Therefore, it is easy to set the transmission output power of the portable-device finding signal to be suitable transmission output power (e.g., which is lower than the transmission output power of a request signal in the door lock control mode, and at which the reception intensity data is hard to saturated) for the device position determination process (in this case, mostly the device position determination within the cabin), without depending on the verification signal. With this, there is little chance of saturating the reception intensity data. This fact additionally proves that the position determination process is highly reliable.

Additionally, in the embodiment, to transmit the portable-device finding signal, the amplitude relations of the transmission output power of the portable-device finding signals emitted from the cabin antennae 24 and 25 are varied for each of the first to third conditions. The stationary device 20 determines the position of the portable device 10 by using a number of reception intensity data items (in this case, six data items) obtained for each setting (conditions). Therefore, the device position may be determined finely and precisely, by using on a variety of reception intensity data items. In the embodiment, the setting of the amplitude relations between the transmission output power of the portable-device finding signals emitted from the cabin antennae 24 and 25 maybe set only for the first condition (the transmission output power emitted from the cabin antenna 24 is equal to that from the cabin antenna 25). In this case, the areas Dd, Dc and Dcc, and Ad, Ac and Acc shown in FIG. 2 or 3 are recognized as the same position area. Accordingly, the resolution (a measure of ability to distinguish between nearly device positions) decreases correspondingly. Therefore, it is impossible to minutely detect a motion of the portable device 10 within the cabin.

A position of the portable device 10 as viewed in the array of the paired stationary-device side antennae 24 and 25 is determined by the magnitude relations of the reception intensity data between the antennae 24 and 25.

Accordingly, the device position is determined by the communication result, which is independent of a variation of the absolute value (or dispersion of the absolute values) of the transmission output power or the reception intensity in the transmission and reception of the portable-device finding signal (the magnitude relations between the reception intensity data items). Therefore, the device position determination is little affected by a performance variation of the transceiving circuit of the portable device 10 and the stationary device 20, antennae and the like or a dispersion of the performance values. The determination of the position of the portable device 10 is always high in reliability. Further, to avoid the unwanted situation, e.g., the saturation of the reception intensity data, it is easy to vary the absolute value of the transmission output power or the reception intensity in the transmission and reception of the portable-device finding signal as a whole in accordance with distance from the portable device 10 to the cabin antennae 24 and 25 (e.g., the transmission output power is increased when the portable device 10 is outside the vehicle, and it is increased when the portable device is inside the vehicle).

In the embodiment, the stationary-device side antennae are the cabin antennae 24 and 25 located on both side corners as viewed in the direction in which the user gets on and off The motor vehicle 1 (viz., in the widthwise direction) (the cabin antennae 24 and 25 are arrayed in the getting-on and off direction of the vehicle 1). For this reason, a position of the portable device 10 as viewed in the getting-on and off direction is finely and exactly determined by a simple process of comparing the magnitudes of the reception intensity data items between the antennae, and further whether the portable device 10 is located inside or outside the cabin and the action of the user A when he get on and off the vehicle are also finely and exactly determined.

Second Embodiment

A second embodiment of the invention will be described. In the second embodiment, a part of the FIG. 5 process of the first embodiment is modified.

Figure 6:
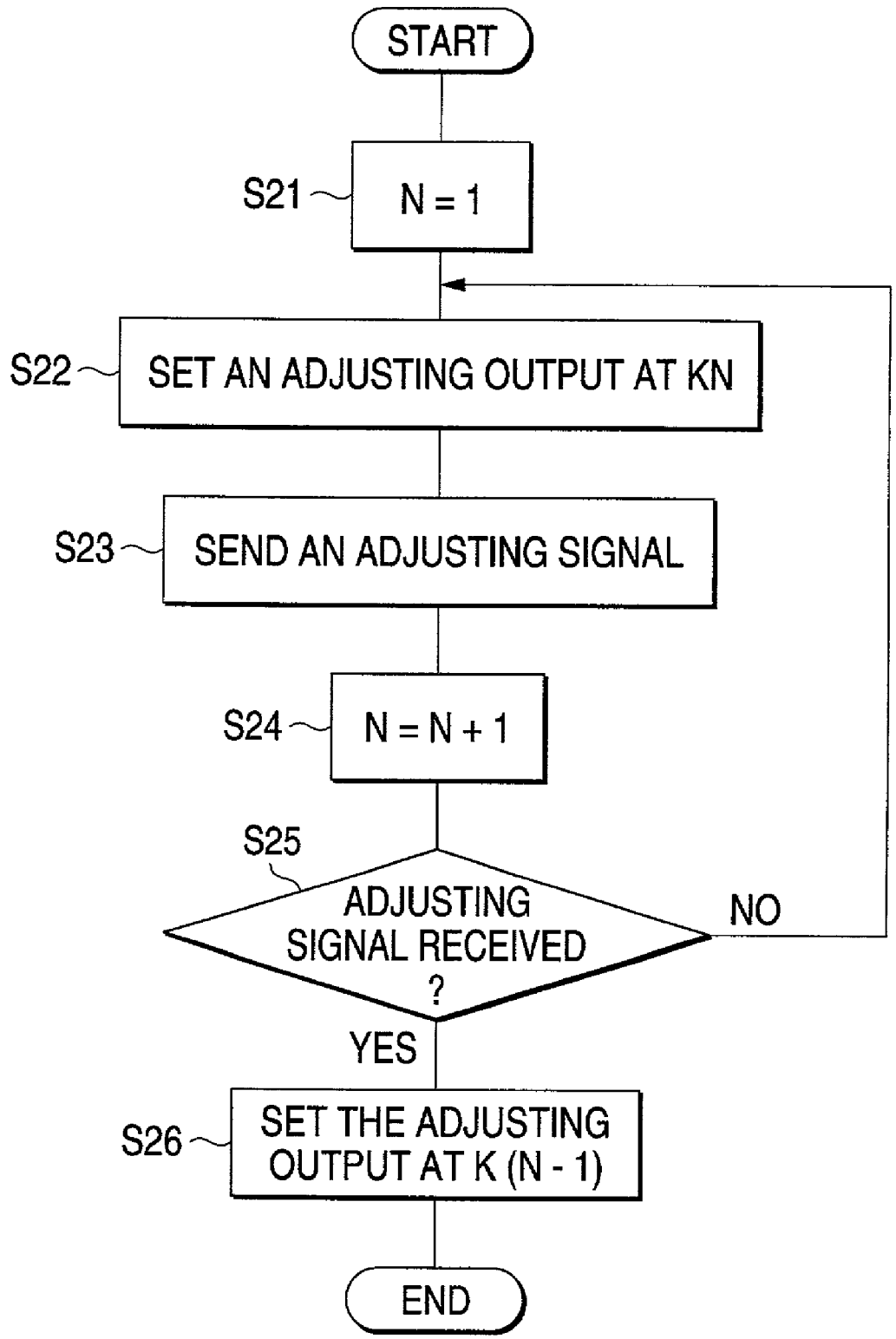
FIG. 6 is a flow chart showing an adjusting operation of a transmission output signal.

In the process of selecting the transmission output power (step S1 in FIG. 5), an output adjustment process as shown in FIG. 6 is executed for each selection, and the transmission output power in the engine start/stop control mode is set (adjusted) to a preferable value for each selection. The transmission output power adjusting technique to be described hereunder may be applied to the adjustment of the transmission output power of the portable-device finding signal (the same thing is true for other embodiments to be described later).

In this case, the control circuit of the portable device 10 having received the mode select report signal sets a parameter N (integer) used for determining the transmission output power to "1" (step S21). Then, the adjusting transmission output power of the transceiving circuit of the portable device 10 is set to "KN" (step S22). "K" is a unit used for the transmission output power adjustment.

The control circuit of the portable device 10 then sends an adjusting signal in a state that the transmission output power is KN (step S23).

The adjusting signal is a signal for requesting the return of a reception ready signal for reporting that the reception is ready. It is preferable that the signal does not contain authentication codes for verification (door lock control authentication code and engine start/stop control authentication code), for the crime prevention. In this case, the adjusting signal contains another authentication code for the output adjustment (adjusting authentication code), so that it is distinguished from an adjusting signal received from another radio system of the same type. When the stationary device 20 receives this adjusting signal by way of the adjusting antenna 40 (or the antenna 24, 25), it sends a reception ready signal (containing the adjusting authentication code stored in the stationary-device side storage means) at sufficiently large power if the adjusting authentication code contained in the adjusting signal is coincident with the adjusting authentication code stored in the stationary-device side storage means.

The control circuit of the portable device 10 sets the parameter N (integer) to "N+1" (step S24), and then judges whether or not a reception ready signal containing a given adjusting authentication code is received (step S25) (the adjusting signal is received by the stationary device 20). If it is not received (viz., the adjusting signal is not received by the stationary device), the control returns to the step S22, and repeats the sequence of steps (viz., the transmission output power is increased by the adjusting unit K, and the adjusting signal is sent again to execute the above judgment).

If it is received (viz., the adjusting signal is received by the stationary device 20), a step S26 is executed to set the transmission output power of the transceiving circuit 21b to "K(N−1)" at least at the time of wireless communication for the verification (the step S12 in the previous case) (viz., the transmission output power is incremented every adjusting unit K, and it is set to a value at which the reception is first possible.).

In this control operation, the output power of the signal transmitted from the portable device 10 (containing at least the authentication code for operating an object to be controlled) is set, at that time, to the least, but necessary transmission output power which can be received by the stationary device 20 (by the adjusting antenna 40 or cabin antennae 24 and 25). It is noted that the transmission output power is not set to a fixed value (a preset value) selected for the controlled object, but it is adjusted to the best transmission output power in accordance with the current situation. Accordingly, the reliability of the device operation is increased, and the crime prevention effect is maximized. Specifically, an answer signal (containing the engine start/stop control authentication code), which is transmitted from the portable device 10 for the engine start/stop permission control of the immobilizer, is reliably received by the stationary device 20. Further, there is no chance that the answer signal is radiated to an excessively broad area to deteriorate the crime prevention. It is finely suppressed (viz., the communication range within which the answer signal can be received may be set to the least, but necessary range in fine steps.).

The FIG. 6 control process (the transmission output power adjustment for the output power selection) mentioned above may be executed in the stationary device 20.

The control circuit 21a, which judges the control mode selection (selection of the engine start/stop control mode) from the setting up of a given trigger (the answer to the step S7, and S9b is affirmative), first sends an adjusting signal of the output power of KN(N−1) to the portable device. It judges whether or not the portable device 10 succeeds in receiving the adjusting signal (or through the adjusting antenna 40). If it fails to receive the adjusting signal, N is incremented in the steps of "1", and the sending of the adjusting signal is repeated. When it first receives the adjusting signal, the transmission output power used for the step S12 is set to the transmission output power when the adjusting signal is first received.

By so doing, the request signal, which is transmitted from the stationary device 20 for the engine start/stop permission control of the immobilizer system (sometimes containing a request authentication code for distinguishing from another device), is reliably received by the portable device 10. Further, there is no chance that the request signal is radiated to an excessively broad area to deteriorate the crime prevention. It is finely suppressed (viz., the communication range within which the request signal can be received may be set to the least, but necessary range in fine steps.). Particularly, when the output power is adjusted on the basis of the result of the judgment whether or not the sending of the adjusting signal to the adjusting antenna 40 is possible, the communication range (i.e., a receivable range of the portable device 10) of the signal sent from the stationary device 20 to the portable device 10 is set extending to a position near the cabin of the motor vehicle 1. For this reason, when the portable device 10 is located within the motor vehicle, the communication is possible, and the function of the immobilizer system is fully utilized with good convenience. The signal (request signal) transmitted from the stationary device 20 is little leaked, and hence the crime prevention on the request signal is maximized in degree.

The illegal listening of the request signal does not lead to the stealing of the vehicle. However, the portable device 10 is caused to send an answer signal by using the request signal. To avoid this, it is preferable to employ such an arrangement as to protect the request from its illegal listening.

Third Embodiment

Now, a third embodiment of the invention will be described. Also in this embodiment, the FIG. 5 control process in the first embodiment is modified partly.

In the embodiment, an output power adjusting process shown in FIG. 5 is adjusted every time the output power selection of the step S11 in FIG. 5 is executed. The transmission output power for the engine start/stop control mode is optimized every output power selection.

In this case, the control circuit of the portable device 10, when receiving the mode select report signal, first sets the parameter N (integer) for determining the transmission output power to "10" (step S31). Thereafter, the transmission output power for adjustment of the transceiving circuit of the portable device 10 is set to "KN" (step S32)

Then, the control circuit of the portable device 10 sends an adjusting signal of the output power KN (step S33).

Then, the control circuit judges whether or not the reception ready signal containing a given adjusting authentication code is received (viz., the adjusting signal is received by the stationary device 20) (step S34). If it is received (the adjusting signal is received by the stationary device 20), the parameter N (integer) is set to "N−2" (step S35), and thereafter, the control returns to the step S32, and the sequence of steps is repeated (the output power is decreased by the amount of two adjusting units K, and the adjusting signal is sent again to execute the above-mentioned judgment again.).

If the given reception ready signal is not received (the adjusting signal is not received by the stationary device 20), a step S36 is executed to set the output power of the transceiving circuit 21*b* to "K(N+1)" at least when the wireless communication for verification is performed (when the step S12 is executed) (the output power is progressively decremented in the steps of the two adjusting units K, and is set to a value being larger than a value at which the signal reception is impossible, by the adjusting unit K). Subsequently, the adjusting signal is sent again with the output power by the step S36 (step S37).

When the reception ready signal containing the given adjusting authentication code is received (viz., the adjustment is received again by the stationary device 20), the output power of the transceiving circuit 21*b* is finally set to "K(N+1)" at least at the time of the wireless communication for verification (step S38, S39).

When the reception ready signal is not received (viz., the adjustment is not received again by the stationary device 20), the output power of the transceiving circuit 21*b* is finally set to "K (N+2)" at least at the time of the wireless communication for verification (step S38, S40).

Also in this control operation, the output power of the signal transmitted from the portable device 10 (containing at least the authentication code) is set, at that time, to the least, but necessary transmission output power. Thus, it is adjusted to the best transmission output power in accordance with the current situation. Accordingly, the reliability of the device operation is increased, and the crime prevention effect is maximized.

A unique feature of the third embodiment resides in that the adjusting step width of the output power is first set at a large value (it is incremented in the steps of 2K), and when the impossible communication first occurs, the wireless communication is performed again, and depending on the result of the re-communication, the adjusting step width is changed to a small step width (in this case, steps S37 to S40). With this feature, the time taken for the adjustment is reduced when comparing with the case in which the output power is gradually adjusted in the small steps (as in the second embodiment).

Figure 7:
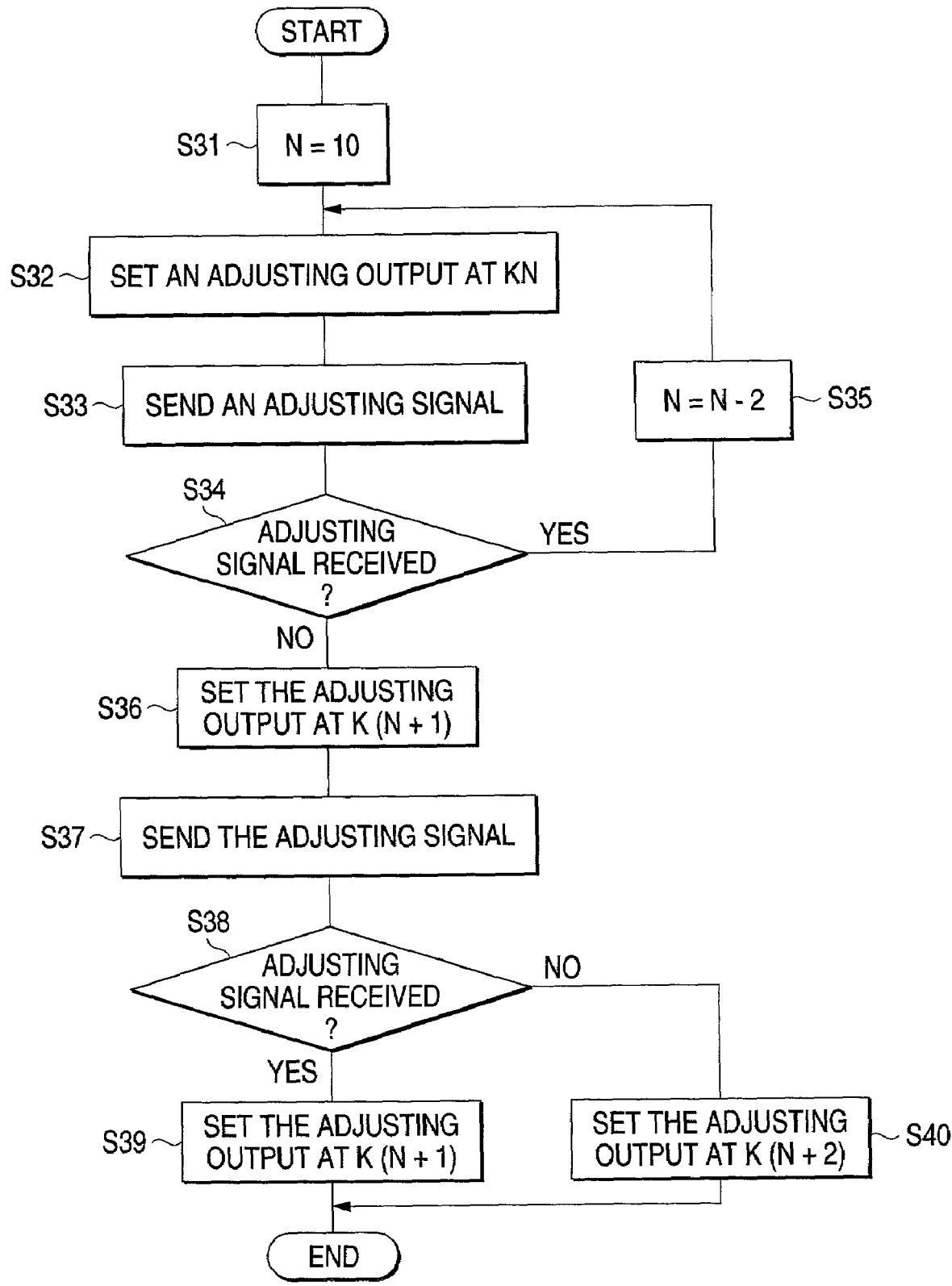
FIG. 7 is a flow chart showing another adjusting operation of a transmission output signal.

The control process of FIG. 7 (another example of the output power at the time of selecting the output power) may be executed in the stationary device 20.

Other Embodiments

It should be understood that the present invention is not limited to the above-mentioned embodiments, but may variously be modified, altered and changed within the true spirits of the invention.

In the embodiments, as described above, the position of the portable device 10 is determined by comparing (the magnitudes of) the reception intensity data of the portable-device finding signals from the cabin antennae 24 and 25. If required, the absolute values of those reception intensity data may be used for the same purpose. Specifically, distances from the cabin antennae 24 and 25 to the portable device 10 are detected by using the absolute values of the reception intensity data. Positions satisfying the two distances on a horizontal plane (parallel to the road surface) are specified by using the positions of the cabin antennae 24 and 25, whereby the absolute value of the portable device 10 on the horizontal plane is judged.

In the above-mentioned embodiments, the reception intensity data is sent as intact as the portable-device finding signal returned from the portable device 10. The position determination of the portable device 10 based on the reception intensity data is carried out in the stationary device 20. In alternative, the process of comparing the reception intensity data (FIG. 2) is carried out in the portable device 10. The portable device 10 returns to the stationary device 20 a portable device finding answer signal containing data indicative of the result of the device position determination process based on the comparing process (containing a mode connection data shown in FIG. 4 or data indicating an area in which the portable device 10 is located).

The position determining process by the stationary device 20 may be realized in the following way.

The portable device 10 responds to a request signal for portable device finding from the stationary device 20, and sends a portable device finding signal. The portable device finding signal from the portable device 10 is received by the stationary-device side cabin antennae 24 and 25 located at different positions. A position of the portable device 10 is determined by using the reception intensity data of the portable-device finding signals from the cabin antennae 24 and 25. In this case, the portable device finding signal is sent three times from the portable device 10. The stationary device receives the portable-device finding signal in three conditions of the reception sensitivities of the cabin antennae 24 and 25 (reception sensitivity of one antenna=reception sensitivity of the other antenna; reception sensitivity of one antenna>reception sensitivity of the other antenna; and reception sensitivity of one antenna<reception sensitivity of the other antenna). If so done, the present embodiment produces useful effects (finer position determination) comparable with those in the case where the output power of the portable device finding signal is set on the basis of the three conditions.

In the embodiments, the one-dimensional absolute position determination of the portable device 10 is performed by using the two antennae. The number of antennae may be increased. Those antennae are handled in pairs. The position determination is carried out for each pair of antennae. In the case, the two-dimensional position determination and finer position determination are possible (the position determination in the vehicle advancing direction is also possible.). To increase the resolution of the position determination, the output power and the reception sensitivity conditions may be set in finer steps.

In the embodiments, the portable device 10 executes the output power selection process in accordance with the selection of the object to be controller. The stationary device 20 also executes the same process. If required, one of the portable device 10 and the stationary device 20 may execute the same process. In the above-mentioned embodiments, the signal containing the most important authentication code information is the answer signal transmitted from the portable device 10. Only the transmission output power of the answer signal of the portable device 10 may be selected by the object to be controlled. Great practical effect is obtained.

In the above-mentioned embodiments, the signal (adjusting signal) being wirelessly transmitted and received contains the adjusting authentication code. To improve the output adjusting rate, such an authentication code is removed from the signal and the verifying process is omitted.

In the embodiments, the output adjusting process shown in FIG. 6 or 7 is executed separately by the portable device 10 and the stationary device 20. If required, the process is executed by only the stationary device 20, and a signal reporting the adjustment result is sent to the portable device 10. The portable device 10 changes the output power to a power value based on the received signal (the portable device 10 does not send the adjusting signal for the output adjustment)

In the embodiments, the mode of the control circuit of the portable device 10 is changed, for communication, from the sleep mode to the normal mode by the wake-up signal by the power transmission. If required, the control circuit of the portable device 10 may be intermittently operated under control of a timer circuit (not shown). In this case, there is no need of sending the wake-up signal.

The invention is operable without the general keyless entry system (in this case, the switches 11 and 12 are not used.).

In the embodiments, the case of using two types of objects to be controlled (the lock device of the vehicle door and the engine control system) is presented. The number of the controlled objects may be increased further. The trigger for starting the process to determine a position of the portable device 10 and select the controlled object and the output power is the door operation, but it is not limited to it. In the case where the lock device for the vehicle door and the engine start/stop control system are used for the controlled objects as in the embodiments, a door knob operation sensor for detecting an operation of the door knob by the user and a door knob sensor for detecting a state that the hands of the user approaches to or touches the door know may be used. The position determination process for the portable device 10 starts in response to a signal output from any of those sensors. And it is detected that the portable device 10 entered the cabin. The control mode is changed to the engine start/stop control mode. The output power suitable for the mode is selected (selection for the engine start/stop control mode).

In the above-mentioned embodiments, the case where the wake-up signal (or the request) is intermittently sent from the stationary device is described. To save power consumption, the wake-up signal or the request signal is not sent till some trigger is set up. In a specific example, the wake-up signal (or the request signal) is not sent till the door knob operating sensor or the door knob sensor is operated, and the locking/unlocking control is executed.

In the embodiments, the position determination for the portable device 10 is carried out only when it is estimated that the user gets on or off the vehicle. When the user gets off, or when a set time terminates, the position determination is stopped. If required, the position determination may be continued for a long time. The position determination may be repeated from an instant that the user carrying the portable device 10 opens the door and gets in the vehicle till the engine actually starts, or from an instant that thereafter the door is closed till the door is locked, or till the position of the portable device 10 does not change.

The present invention may be applied to various objects to be controlled and control contents while not limited to the locking and unlocking of the door and the engine start, as already stated referred to in the discussion of the related art.

For the same object to be controlled, the control contents and the output power may be selected depending on the position determination of the portable device.

The portable device 10 may have a plurality of switches. In this case, various remote controls (manual operations) may be made by using those switches. Examples of those switches are switches for remotely opening and closing the trunk, engine room or cap device for fuel tank or the like, a panic switch for sounding a horn against the ruffian.

The invention may be applied to any other system than the vehicle entry system if it is based on a wireless communication between the portable device and the stationary device.

In a radio system, a position of a portable device is determined by reception intensity data of portable-device finding signals received by a plurality of stationary-device side antennae located at different positions. Therefore, if the portable device is located close to the stationary-device side antenna and a reception intensity of the portable-device finding signal from the antenna is saturated, the position determination as mentioned above is made in very fine steps since a reception intensity of the portable-device finding signal from another stationary-device side cabin antenna varies. The position determination is made at finer steps when comparing with a case using a single antenna. Therefore, even when stationary device is located at a delicate position inside or outside the vehicle, the position of the portable device can exactly be determined. A radio system, which determines the position of the portable device in terms of distance from one antenna by using reception intensity data at the antenna, cannot detect an absolute position of the portable device (although it can detect only whether or not the portable device approaches to the antenna). In this connection, the radio system of the invention grasps an absolute position of the portable device and can continuously detect a changing position of the portable device.

What is claimed is:

1. A radio system comprising:
   a portable device; and
   a stationary device for wirelessly communicating with said portable device, wherein
   said portable device operates such that when said portable device receives first signals from said stationary device, said portable device sends second signals representative of reception intensity data of the first signals back to said stationary device, and
   said stationary device sends the first signals from a plurality of stationary-device side antennae located at different positions respectively, and when said stationary device receives the second signals from said portable device through the respective stationary-device side antennae, said stationary device determines a position of said portable device by using the reception intensity data of the first signals included in the respective second signals, wherein said stationary device varies the setting of the relation of the amplitudes between transmission output powers of the first signals from said respective stationary-device side antennae and sends the first signals, and said stationary device determines the position of said portable device by using the reception intensity data obtained for each said setting, said stationary device is arranged to vary the setting of the relation between transmission output powers of the first signals among a plurality of conditions including at least a first condition, a second condition and a third condition, wherein in the first condition the transmission output power of one of the plurality of stationary-device side antennae is larger than an other of the plurality of stationary-device side antennae, in the second condition the transmission output power of the one of the plurality of stationary-device side antennae is equal to the other, and in the third condition the transmission output power of the one of the plurality of stationary-device side antennae is less than the other, the first signals include an identification code of each antenna and a condition code specifying which of said first condition, second condition or third condition is being used, the second signals, in addition to the reception intensity data, contain said antenna identification code and said condition code.

2. A radio system comprising:

a portable device; and a stationary device for wirelessly communicating with said portable device, wherein said stationary device sends first signals from a plurality of stationary-device side antennae located at different positions, and said portable device operates such that when said portable device receives the first signals from said stationary-device side antennae of said stationary device, said portable device determines a position of said portable device by using reception intensity data of the respective first signals, and sends a second signal representative of the result of the position determination back to said stationary device, wherein said stationary device varies the setting of the relation of the amplitudes between transmission output powers of the first signals from said respective stationary-device side antennae and sends the first signals, and said portable device determines the position of said portable device by using the reception intensity data obtained for each said setting, said stationary device is arranged to vary the setting of the relation between transmission output powers of the first signals among a plurality of conditions including at least a first condition, a second condition and a third condition, wherein in the first condition transmission output power of one of the plurality of stationary-device side antennae is larger than an other of the plurality of stationary-device side antennae, in the second condition transmission output power of the one of the plurality of stationary-device side antennae is equal to the other, and in the third condition transmission output power of the one of the plurality of stationary-device side antennae is less than the other, the first signals include an identification code of each antenna and each condition code specifying which of said first condition, second condition or third condition is being used, the second signals, in addition to the reception intensity data, contain said antenna identification code and said condition code.

3. The radio system according to claim 1, wherein said stationary device is mounted on a vehicle, and said stationary device and/or said portable device judges from the position determination result that said portable device is inside or outside said vehicle, that a user carrying said portable device gets on said vehicle, or that said user gets off said vehicle.

4. The radio system according to claim 3, wherein said stationary device wirelessly communicates with said portable device to verify that said portable device is a predetermined one, and automatically executes a control process for realizing a predetermined operation of an object to be controlled in said vehicle, and when judging that the user carrying said portable device got on the vehicle, said stationary device selects a kind of the controlled object or control contents of the controlled object.

5. The radio system according to claim 4, wherein the controlled object includes a device for locking and unlocking the doors of the vehicle, and the control process includes a signal output for causing said device to operate for locking or unlocking.

6. The radio system according to claim 3, wherein said stationary device wirelessly communicates with said portable device to verify that said portable device is a predetermined one, and automatically executes a control process for realizing a predetermined operation of an object to be controlled in said vehicle, and when judging that the user carrying said portable device got on the vehicle, said stationary device and/or said portable device selects such transmission output power of the wireless communication for the verification as to reduce a communication range.

7. The radio system according to claim 6, wherein the transmission output power is selected to change the wireless communication range for the verification from a relatively broad remote control range including positions outside the vehicle, which are remote from the vehicle by a predetermined distance, to a narrow range within the vehicle.

8. The radio system according to claim 7, wherein said portable device includes transmission power adjustment means for adjusting the transmission output power in set increments, and wherein a minimum transmission output power that is received by each of said antennae is selected as the transmission output power for use by said portable device.

* * * * *